United States Patent
Zhao (10) Patent No.: US 10,523,866 B2
(45) Date of Patent: Dec. 31, 2019

(54) MOBILE TERMINAL IMAGE SYNTHESIS METHOD, MOBILE TERMINAL IMAGE SYNTHESIS APPARATUS AND MOBILE TERMINAL

(71) Applicant: BOE TECHNOLOGY GROUP CO., LTD., Beijing (CN)

(72) Inventor: Xingxing Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/951,486

(22) Filed: Apr. 12, 2018

(65) Prior Publication Data
US 2019/0068877 A1    Feb. 28, 2019

(30) Foreign Application Priority Data
Aug. 28, 2017   (CN) .......................... 2017 1 0748632

(51) Int. Cl.
*G06T 3/00*    (2006.01)
*H04N 5/232*   (2006.01)
(Continued)

(52) U.S. Cl.
CPC ....... *H04N 5/23238* (2013.01); *G06T 3/0018* (2013.01); *G06T 3/4038* (2013.01);
(Continued)

(58) Field of Classification Search
CPC ..... H04N 5/23238; G06T 3/0018; G06T 7/97; G06T 5/006; G06T 2207/20221; G02B 13/06
See application file for complete search history.

(56) References Cited

U.S. PATENT DOCUMENTS

2006/0268131 A1*  11/2006  Cutler ..................... G06T 5/008
                                                   348/239
2014/0098185 A1*   4/2014  Davari ............... H04N 5/23238
                                                    348/36
(Continued)

FOREIGN PATENT DOCUMENTS

CN        106210547 A      12/2016
CN        106379239 A       2/2017
(Continued)

OTHER PUBLICATIONS

First Office Action for Chinese Application No. 201710748632.X, dated Mar. 13, 2019, 7 Pages.

*Primary Examiner* — Zhihan Zhou
(74) *Attorney, Agent, or Firm* — Brooks Kushman P.C.

(57) ABSTRACT

The present disclosure provides a mobile terminal image synthesis method, a mobile terminal image synthesis apparatus and a mobile terminal. The mobile terminal image synthesis method includes: acquiring a first fisheye image collected by a front fisheye camera group and a second fisheye image collected by a rear fisheye camera group; obtaining a first correction image by using a first internal parameter of the front fisheye camera group to correct the first fisheye image, and obtaining a second correction image by using a second internal parameter of the rear fisheye camera group to correct the second fisheye image; and obtaining a synthetic image by splicing and combining the first correction image and the second correction image according to splicing parameters.

10 Claims, 3 Drawing Sheets

--- acquiring a first fisheye image collected by a front fisheye camera group and a second fisheye image collected by a rear fisheye camera group — 101 obtaining a first correction image by using a first internal parameter of the front fisheye camera group to correct the first fisheye image, and obtaining a second correction image by using a second internal parameter of the rear fisheye camera group to correct the second fisheye image — 102 obtaining a synthetic image by splicing and combining the first correction image and the second correction image according to splicing parameters which are obtained in advance through calculation — 103

(51) Int. Cl.
*G06T 7/00* (2017.01)
*G06T 3/40* (2006.01)
*H04N 17/00* (2006.01)
G02B 13/06 (2006.01)
G06T 5/00 (2006.01)

(52) U.S. Cl.
CPC ............. *G06T 7/97* (2017.01); *H04N 17/002* (2013.01); *G02B 13/06* (2013.01); *G06T 5/006* (2013.01); *G06T 2207/20221* (2013.01)

(56) References Cited

U.S. PATENT DOCUMENTS

| | | | | |
|---|---|---|---|---|
| 2015/0035951 | A1* | 2/2015 | Jayaram | H04N 5/2253 |
| | | | | 348/47 |
| 2016/0309087 | A1* | 10/2016 | Jayaram | H04N 5/23238 |
| 2017/0076477 | A1 | 3/2017 | Nakakusu | |
| 2017/0091899 | A1* | 3/2017 | Mitsui | G06T 3/0081 |
| 2017/0150122 | A1* | 5/2017 | Cole | H04N 13/243 |
| 2019/0014260 | A1* | 1/2019 | Mu | G06T 3/0093 |

FOREIGN PATENT DOCUMENTS

| | | |
|---|---|---|
| CN | 106454046 A | 2/2017 |
| CN | 106534665 A | 3/2017 |
| CN | 206060945 U | 3/2017 |
| WO | 2017116328 A1 | 7/2017 |

\* cited by examiner

MOBILE TERMINAL IMAGE SYNTHESIS METHOD, MOBILE TERMINAL IMAGE SYNTHESIS APPARATUS AND MOBILE TERMINAL

CROSS-REFERENCE TO RELATED APPLICATION

This application claims priority to Chinese Patent Application No. 201710748632.X filed on Aug. 28, 2017, which is incorporated herein by reference in its entirety.

TECHNICAL FIELD

The present disclosure relates to the field of image processing technology, and in particular to a mobile terminal image synthesis method, a mobile terminal image synthesis apparatus and a mobile terminal.

BACKGROUND

With development of terminals, terminal cameras have become a basic standard configuration for mobile terminals such as mobile phones and wearable devices. More and more users are accustomed to using the terminal cameras for image shooting, which brings great convenience to people's work and life. However, the current terminal cameras have a very limited viewing angle, about 90 degrees, and cannot take a panoramic image.

In order to take a panoramic image, the current commonly used method is to use a special camera such as Samsung 360 Gear and LG 360 CAM to take images. However, the special camera is inconvenient to carry, and cannot satisfy the users' requirement for conveniently obtaining panoramic images in real time.

SUMMARY

According to a first aspect, one embodiment of the present disclosure provides a mobile terminal image synthesis method including: acquiring a first fisheye image collected by a front fisheye camera group and a second fisheye image collected by a rear fisheye camera group, wherein the front fisheye camera group is formed by applying a fisheye lens to a front camera of a mobile terminal, and the rear fisheye camera group is formed by applying a fisheye lens to a rear camera of the mobile terminal, and a viewing angle of each of the front fisheye camera group and the rear fisheye camera group is greater than 180 degrees; obtaining a first correction image by using a first internal parameter of the front fisheye camera group to correct the first fisheye image, and obtaining a second correction image by using a second internal parameter of the rear fisheye camera group to correct the second fisheye image; and obtaining a synthetic image by splicing and combining the first correction image and the second correction image according to splicing parameters.

Optionally, before the acquiring a first fisheye image collected by a front fisheye camera group and a second fisheye image collected by a rear fisheye camera group, the method further includes: determining the first internal parameter of the front fisheye camera group and the second internal parameter of the rear fisheye camera group; and calculating the splicing parameters between the front fisheye camera group and the rear fisheye camera group.

Optionally, the determining the first internal parameter of the front fisheye camera group and the second internal parameter of the rear fisheye camera group includes: when rotating the mobile terminal around a vertical axis or a horizontal axis of the mobile terminal, obtaining each frame fisheye-image of the checkerboard collected by the front fisheye camera group and each frame fisheye-image of the checkerboard collected by the rear fisheye camera group, respectively, wherein all or parts of the checkerboard is in the view angle of at least one of the front fisheye camera group and the rear fisheye camera group all the time; determining, by a gyroscope of the mobile terminal, a first rotation angle of the mobile terminal when the front fisheye camera group collects each frame fisheye-image of the checkerboard and a second rotation angle of the mobile terminal when the rear fisheye camera group collects each frame fisheye-image of the checkerboard, respectively; and obtaining the first internal parameter through calculation according to a projective reconstruction calibration algorithm based on each frame fisheye-image of the checkerboard collected by the front fisheye camera group and the first rotation angle, and obtaining the second internal parameter through calculation according to the projective reconstruction calibration algorithm based on each frame fisheye-image of the checkerboard collected by the rear fisheye camera group and the second rotation angle.

Optionally, the calculating the splicing parameters between the front fisheye camera group and the rear fisheye camera group includes: when a sum of a first angle that is defined between an optical axis of the front fisheye camera group and the checkerboard and a second angle that is defined between an optical axis of the rear fisheye camera group and the checkerboard is less than a first angle threshold, obtaining a first checkerboard fisheye image of the checkerboard collected by the front fisheye camera group and a second checkerboard fisheye image of the checkerboard collected by the rear fisheye camera group; obtaining a first checkerboard correction image by using the first internal parameter to correct the first checkerboard fisheye image, and a second checkerboard correction image by using the second internal parameter to correct the second checkerboard fisheye image; and calculating splicing parameters between the first checkerboard correction image and the second checkerboard correction image according to matching information of checkerboard corners in the first checkerboard correction image and the second checkerboard correction image. The splicing parameters between the first checkerboard correction image and the second checkerboard correction image are the splicing parameters between the front fisheye camera group and the rear fisheye camera group.

Optionally, the splicing parameters include a translation vector and a rotation angle.

According to another aspect, one embodiment of the present disclosure provides a mobile terminal image synthesis apparatus including: an acquiring device configured to acquire a first fisheye image collected by a front fisheye camera group and a second fisheye image collected by a rear fisheye camera group, wherein the front fisheye camera group is formed by applying a fisheye lens to a front camera of a mobile terminal, and the rear fisheye camera group is formed by applying a fisheye lens to a rear camera of the mobile terminal, and a viewing angle of each of the front fisheye camera group and the rear fisheye camera group is greater than 180 degrees; a correction device configured to obtain a first correction image by using a first internal parameter of the front fisheye camera group to correct the first fisheye image and obtain a second correction image by using a second internal parameter of the rear fisheye camera group to correct the second fisheye image; and a splicing device configured to obtain a synthetic image by splicing and combining the first correction image and the second correction image according to splicing parameters.

Optionally, the apparatus further includes: a determining device configured to determine the first internal parameter of the front fisheye camera group and the second internal parameter of the rear fisheye camera group, respectively; and a calculation device configured to calculate the splicing parameters between the front fisheye camera group and the rear fisheye camera group.

Optionally, the determining device includes: a first obtaining circuit configured to, when rotating the mobile terminal around a vertical axis or a horizontal axis of the mobile terminal, obtain each frame fisheye-image of the checkerboard collected by the front fisheye camera group and each frame fisheye-image of the checkerboard collected by the rear fisheye camera group, respectively, where all or parts of the checkerboard is in the view angle of at least one of the front fisheye camera group and the rear fisheye camera group all the time; a determining circuit configured to, determine, by a gyroscope of the mobile terminal, a first rotation angle of the mobile terminal when the front fisheye camera group collects each frame fisheye-image of the checkerboard and a second rotation angle of the mobile terminal when the rear fisheye camera group collects each frame fisheye-image of the checkerboard, respectively; and a first calculation circuit configured to obtain the first internal parameter through calculation according to a projective reconstruction calibration algorithm based on each frame fisheye-image of the checkerboard collected by the front fisheye camera group and the first rotation angle, and obtain the second internal parameter through calculation according to the projective reconstruction calibration algorithm based on each frame fisheye-image of the checkerboard collected by the rear fisheye camera group and the second rotation angle.

Optionally, the calculation device includes: a second obtaining circuit configured to, when a sum of a first angle that is defined between an optical axis of the front fisheye camera group and the checkerboard and a second angle that is defined between an optical axis of the rear fisheye camera group and the checkerboard is less than a first angle threshold, obtain a first checkerboard fisheye image of the checkerboard collected by the front fisheye camera group and a second checkerboard fisheye image of the checkerboard collected by the rear fisheye camera group; a correction circuit configured to obtain a first checkerboard correction image by using the first internal parameter to correct the first checkerboard fisheye image and a second checkerboard correction image by using the second internal parameter to correct the second checkerboard fisheye image; and a second calculation circuit configured to calculate splicing parameters between the first checkerboard correction image and the second checkerboard correction image according to matching information of checkerboard corners in the first checkerboard correction image and the second checkerboard correction image. The splicing parameters between the first checkerboard correction image and the second checkerboard correction image are the splicing parameters between the front fisheye camera group and the rear fisheye camera group.

Optionally, the splicing parameters include a translation vector and a rotation angle.

According to another aspect, one embodiment of the present disclosure provides a mobile terminal including a memory, a processor and an image synthesis program stored in the memory and executable by the processor. When the image synthesis program is executed by the processor, the image synthesis program causes the processor to perform the above mobile terminal image synthesis method.

Optionally, when the image synthesis program is executed by the processor, the image synthesis program causes the processor to, determine the first internal parameter of the front fisheye camera group and the second internal parameter of the rear fisheye camera group; and calculate the splicing parameters between the front fisheye camera group and the rear fisheye camera group.

Optionally, when the image synthesis program is executed by the processor, the image synthesis program causes the processor to, when rotating the mobile terminal around a vertical axis or a horizontal axis of the mobile terminal, obtain each frame fisheye-image of the checkerboard collected by the front fisheye camera group and each frame fisheye-image of the checkerboard collected by the rear fisheye camera group, respectively, where all or parts of the checkerboard is in the view angle of at least one of the front fisheye camera group and the rear fisheye camera group all the time; determine, by a gyroscope of the mobile terminal, a first rotation angle of the mobile terminal when the front fisheye camera group collects each frame fisheye-image of the checkerboard and a second rotation angle of the mobile terminal when the rear fisheye camera group collects each frame fisheye-image of the checkerboard, respectively; and obtain the first internal parameter through calculation according to a projective reconstruction calibration algorithm based on each frame fisheye-image of the checkerboard collected by the front fisheye camera group and the first rotation angle, and obtain the second internal parameter through calculation according to the projective reconstruction calibration algorithm based on each frame fisheye-image of the checkerboard collected by the rear fisheye camera group and the second rotation angle.

Optionally, when the image synthesis program is executed by the processor, the image synthesis program causes the processor to, when a sum of a first angle that is defined between an optical axis of the front fisheye camera group and the checkerboard and a second angle that is defined between an optical axis of the rear fisheye camera group and the checkerboard is less than a first angle threshold, obtain a first checkerboard fisheye image of the checkerboard collected by the front fisheye camera group and a second checkerboard fisheye image of the checkerboard collected by the rear fisheye camera group; obtain a first checkerboard correction image by using the first internal parameter to correct the first checkerboard fisheye image, and a second checkerboard correction image by using the second internal parameter to correct the second checkerboard fisheye image; and calculate splicing parameters between the first checkerboard correction image and the second checkerboard correction image according to matching information of checkerboard corners in the first checkerboard correction image and the second checkerboard correction image. The splicing parameters between the first checkerboard correction image and the second checkerboard correction image are the splicing parameters between the front fisheye camera group and the rear fisheye camera group.

Optionally, the splicing parameters include a translation vector and a rotation angle.

According to another aspect, one embodiment of the present disclosure provides a computer-readable memory storing an image synthesis program. When the image synthesis program is executed by a processor, the image synthesis program causes the processor to perform the above mobile terminal image synthesis method.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

The above drawings have shown embodiments of the present disclosure which will be described in detail in the following. The drawings and description are not intended to limit the scope of conception of the present disclosure in any way, but serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of devices and methods consistent with aspects related to the disclosure as recited in the appended claims.

The first thing to say is that in the present disclosure, a front fisheye camera group is formed by applying a fisheye lens to a common front camera, and a viewing angle of the front fisheye camera group is greater than 180 degrees; a rear fisheye camera group is formed by applying a fisheye lens to a common rear camera, and a viewing angle of the rear fisheye camera group is greater than 180 degrees. As the current mobile terminal usually has front and rear cameras, thus the fisheye lenses may be applied to the front and rear cameras, thereby forming the front fisheye camera group and the rear fisheye camera group, respectively. Since the viewing angle of the fisheye camera group is greater than 180 degrees and the fisheye lens is small and portable, a mobile terminal image synthesis method of one embodiment of the present disclosure can satisfy users' requirement for conveniently obtaining panoramic images in real time in case that the current mobile terminal can display panoramic images.

Figure 1:
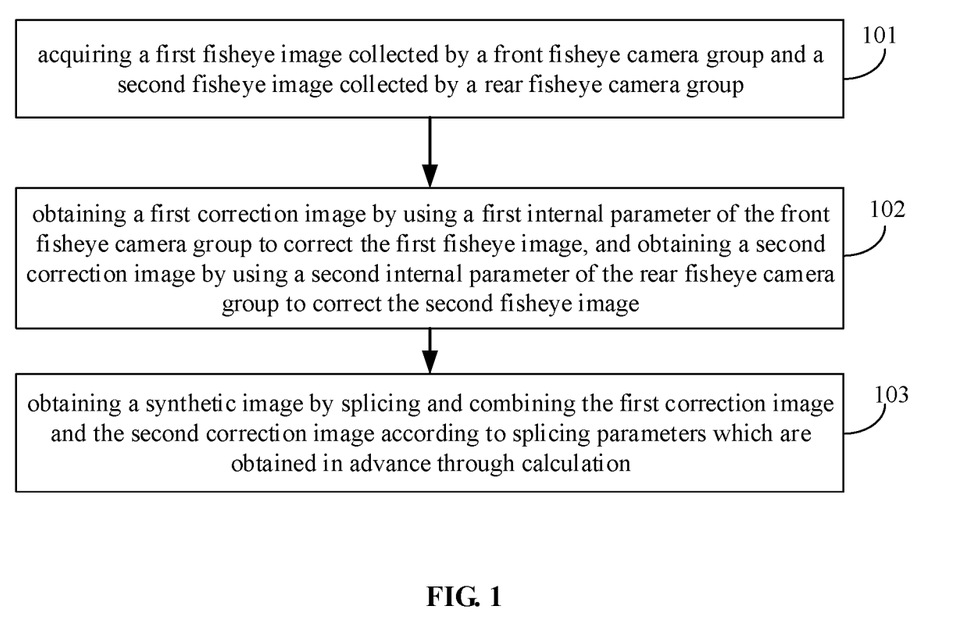
FIG. 1 is a flow chart of a mobile terminal image synthesis method according to an embodiment of the present disclosure.

Referring to FIG. 1, one embodiment of the present disclosure provides a mobile terminal image synthesis method including the following steps 101 to 103.

The step 101 is to acquire a first fisheye image collected by a front fisheye camera group and a second fisheye image collected by a rear fisheye camera group.

The step 102 is to obtain a first correction image by using a first internal parameter of the front fisheye camera group to correct the first fisheye image, and obtain a second correction image by using a second internal parameter of the rear fisheye camera group to correct the second fisheye image.

The step 103 is to obtain a synthetic image by splicing and combining the first correction image and the second correction image according to splicing parameters which are obtained in advance through calculation.

The front fisheye camera group may be formed by applying a fisheye lens to a front camera of a mobile terminal, and the rear fisheye camera group may be formed by applying a fisheye lens to a rear camera of the mobile terminal. A viewing angle of each of the front fisheye camera group and the rear fisheye camera group is greater than 180 degrees. Since the viewing angle of each of the front fisheye camera group and the rear fisheye camera group is greater than 180 degrees, a synthetic image obtained according to the mobile terminal image synthesis method of one embodiment of the present disclosure is a panoramic image. It should be noted that, in the process of shooting video, if each frame image is processed according to the mobile terminal image synthesis method of one embodiment of the present disclosure, then a 360-degree panoramic video may be obtained.

Generally, internal and external parameters of one corresponding fisheye camera group are used to correct the fisheye images. However, in one embodiment, relative positions and a distance between the front fisheye camera group and the rear fisheye camera group are fixed, thus the fisheye images can be corrected only through the internal parameters, thereby simplifying the correction process. The internal parameters of the fisheye camera group at least include a focal length, a scale factor, a lateral distortion factor, and a longitudinal distortion factor, etc.

According to the mobile terminal image synthesis method of one embodiment of the present disclosure, the fisheye images collected by the front fisheye camera group and the rear fisheye camera group are corrected, spliced and combined. As the current mobile terminal usually has front and rear cameras, thus the fisheye lenses may be applied to the front and rear cameras, thereby forming the front fisheye camera group and the rear fisheye camera group, respectively. Since the viewing angle of the fisheye camera group is greater than 180 degrees and the fisheye lens is small and portable, the mobile terminal image synthesis method of one embodiment of the present disclosure can satisfy users' requirement for conveniently obtaining panoramic images in real time in case that the current mobile terminal can display panoramic images.

Although the fisheye camera group can obtain scene information in a range of a substantial hemispherical surface at one time and is easy to use, the fisheye image collected by the fisheye camera group has a very serious distortion which adversely affects image information. In order to use the information of fisheye images, the fisheye camera group may be first calibrated to obtain the internal and external parameters of the fisheye camera group, and then fisheye images can be corrected by using the obtained internal and external parameters after collection of the fisheye images, thereby obtaining usable correction images. The fisheye camera group may be calibrated by means of a checkerboard calibration method, a self-calibration method, etc. Further, in one embodiment, in order to obtain perfect panoramic images, the splicing parameters between the front fisheye camera group and the rear fisheye camera group can be obtained through calculation according to a checkerboard corner match algorithm, etc.

Specifically, before the step 101, the mobile terminal image synthesis method further includes: determining, by the mobile terminal, the first internal parameter of the front fisheye camera group and the second internal parameter of the rear fisheye camera group by means of a checkerboard calibration method, a self-calibration method, etc.; and calculating, by the mobile terminal, the splicing parameters between the front fisheye camera group and the rear fisheye camera group by means of a checkerboard corner match algorithm, etc.

In one embodiment, in order to simplify the calibration process, the mobile terminal may determine the internal parameter according to the checkerboard calibration method. When the front fisheye camera group and the rear fisheye camera group of the mobile terminal are calibrated with a checkerboard, the front fisheye camera group and the rear fisheye camera group may be simultaneously calibrated, respectively, and the calibration process can be realized by rotating the mobile terminal around its vertical axis or horizontal axis. During the process of rotating the mobile terminal around its vertical axis or horizontal axis, all or parts of the checkerboard should be in the view angle of the front fisheye camera group and/or the rear fisheye camera group all the time. A distance between the checkerboard and the mobile terminal may be in a range of from 30 cm to 50 cm, which is not limited to this. Sizes of the checkerboard may be determined according to actual calibration process.

In one embodiment, the process that the mobile terminal determines the first internal parameter of the front fisheye camera group and the second internal parameter of the rear fisheye camera group, respectively, may include:

when rotating the mobile terminal around its vertical axis or horizontal axis, obtaining each frame fisheye-image of the checkerboard collected by the front fisheye camera group and each frame fisheye-image of the checkerboard collected by the rear fisheye camera group, respectively, where during the process of rotating the mobile terminal around its vertical axis or horizontal axis, all or parts of the checkerboard is in the view angle of the front fisheye camera group and/or the rear fisheye camera group all the time;

determining, by a gyroscope of the mobile terminal, a first rotation angle of the mobile terminal when the front fisheye camera group collects each frame fisheye-image of the checkerboard and a second rotation angle of the mobile terminal when the rear fisheye camera group collects each frame fisheye-image of the checkerboard, respectively; and obtaining the first internal parameter through calculation according to the projective reconstruction calibration algorithm based on each frame fisheye-image of the checkerboard collected by the front fisheye camera group and the corresponding first rotation angle, and obtaining the second internal parameter through calculation according to the projective reconstruction calibration algorithm based on each frame fisheye-image of the checkerboard collected by the rear fisheye camera group and the corresponding second rotation angle.

In this way, the calculation process can be realized by using gyroscope data to determine rotation angles. On one hand, the calibration process can be accelerated. On the other hand, an accuracy of the determined rotation angle can be improved and then an accuracy of the calculation process can be improved accordingly.

It should be noted that the projective reconstruction calibration algorithm in one embodiment of the present disclosure may adopt the projective reconstruction calibration algorithm in the related art with the difference that the projective reconstruction calibration algorithm in one embodiment of the present disclosure uses the gyroscope data to determine the rotation angles.

For example, in one embodiment of the present disclosure, the process of calibrating the front fisheye camera group by means of the projective reconstruction calibration algorithm may include:

first, during the process of rotating the mobile terminal around its vertical axis or horizontal axis, collecting fisheye images of the checkerboard with the front fisheye camera group, continuously monitoring distortion of a central cell of the checkerboard in each frame fisheye image, and selecting a fisheye image P0 in which the distortion of the central cell of the checkerboard is smallest;

for the fisheye image P0, determining coordinates of a central point of the checkerboard in a predetermined coordinate system as (u0, v0), and determining a corresponding rotation angle of the mobile terminal as an angle A according to gyroscope data;

selecting at least four-frame fisheye images including fisheye images P1, P2, P3 and P4, and determining rotation angles of the mobile terminal corresponding to the four-frame fisheye images as A+30°, A−30°, A+60° and A−60°, respectively;

calculating a focal length f and a scale factor a based on the following formulas:

$$f = \sqrt{(P_i Q P_i^T)_{22} - v_0^2} \text{ and}$$

$$a = \frac{\sqrt{(P_i Q P_i^T)_{11} - u_0^2}}{f},$$

where Pi represents a projection matrix of the mobile terminal to the predetermined coordinate system when collecting each frame fisheye image; Q represents a spatial point matrix of the mobile terminal; Pi and Q are known for the predetermined coordinate system; and calculating a lateral distortion factor k1 and a longitudinal distortion factor k2.

The above process of calibrating the front fisheye camera group may be applied to the rear fisheye camera group, which will not be repeated herein.

In one embodiment of the present disclosure, the process that the mobile terminal calculates the splicing parameters between the front fisheye camera group and the rear fisheye camera group may include:

when a sum of a first angle that is defined between an optical axis of the front fisheye camera group and the checkerboard and a second angle that is defined between an optical axis of the rear fisheye camera group and the checkerboard is less than a predetermined angle threshold (also referred as a first threshold), obtaining, by the mobile terminal, a first checkerboard fisheye image of the checkerboard collected by the front fisheye camera group and a second checkerboard fisheye image of the checkerboard collected by the rear fisheye camera group; where the predetermined angle threshold is generally proximate to 0 degrees, may be set according to actual conditions of the front fisheye camera group and the rear fisheye camera group and is used to ensure that the optical axis of the front fisheye camera group and the optical axis of the rear fisheye camera group are parallel to the checkerboard as far as possible when the sum of the first angle and the second angle is less than the predetermined angle threshold;

obtaining, by the mobile terminal, a first checkerboard correction image by using the first internal parameter to correct the first checkerboard fisheye image, and a second checkerboard correction image by using the second internal parameter to correct the second checkerboard fisheye image; and calculating, by the mobile terminal, splicing parameters between the first checkerboard correction image and the second checkerboard correction image according to matching information of checkerboard corners in the first checkerboard correction image and the second checkerboard correction image.

The splicing parameters between the first checkerboard correction image and the second checkerboard correction image are the splicing parameters between the front fisheye camera group and the rear fisheye camera group. The splicing parameters may include a translation vector and a rotation angle, which may, for example, indicate how to enable checkerboard corners in the first checkerboard correction image to overlap and match checkerboard corners in the second checkerboard correction image through translation and rotation of the first checkerboard correction image. It should be noted that, in order to improve an accuracy of the final splicing parameters obtained via calculation, the mobile terminal may calculate several groups of splicing parameters and takes mean values of the groups of splicing parameters as the final splicing parameters obtained via calculation.

The above embodiments describe the mobile terminal image synthesis method of the present disclosure. The mobile terminal image synthesis apparatus of the present disclosure will be described hereinafter in conjunction with embodiments and drawings.

Figure 2:
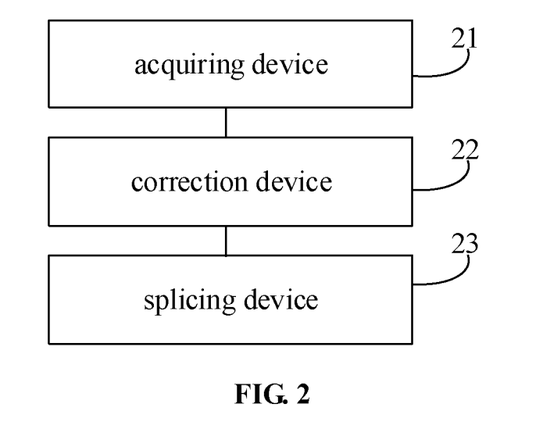
FIG. 2 is a schematic view of a mobile terminal image synthesis apparatus according to an embodiment of the present disclosure.

Referring to FIG. 2, one embodiment of the present disclosure provides a mobile terminal image synthesis apparatus including an acquiring device 21, a correction device 22 and a splicing device 23.

The acquiring device 21 is used to acquire a first fisheye image collected by a front fisheye camera group and a second fisheye image collected by a rear fisheye camera group. In one embodiment, the front fisheye camera group is formed by applying a fisheye lens to a front camera of a mobile terminal, and the rear fisheye camera group is formed by applying a fisheye lens to a rear camera of the mobile terminal. A viewing angle of each of the front fisheye camera group and the rear fisheye camera group is greater than 180 degrees.

The correction device 22 is used to obtain a first correction image by using a first internal parameter of the front fisheye camera group to correct the first fisheye image and obtain a second correction image by using a second internal parameter of the rear fisheye camera group to correct the second fisheye image.

The splicing device 23 is used to obtain a synthetic image by splicing and combining the first correction image and the second correction image according to splicing parameters which are obtained in advance through calculation.

According to the mobile terminal image synthesis method of one embodiment of the present disclosure, the fisheye images collected by the front fisheye camera group and the rear fisheye camera group are corrected, spliced and combined. As the current mobile terminal usually has front and rear cameras, thus the fisheye lenses may be applied to the front and rear cameras, thereby forming the front fisheye camera group and the rear fisheye camera group, respectively. Since the viewing angle of the fisheye camera group is greater than 180 degrees and the fisheye lens is small and portable, the mobile terminal image synthesis method of one embodiment of the present disclosure can satisfy users' requirement for conveniently obtaining panoramic images in real time in case that the current mobile terminal can display panoramic images.

Figure 3:
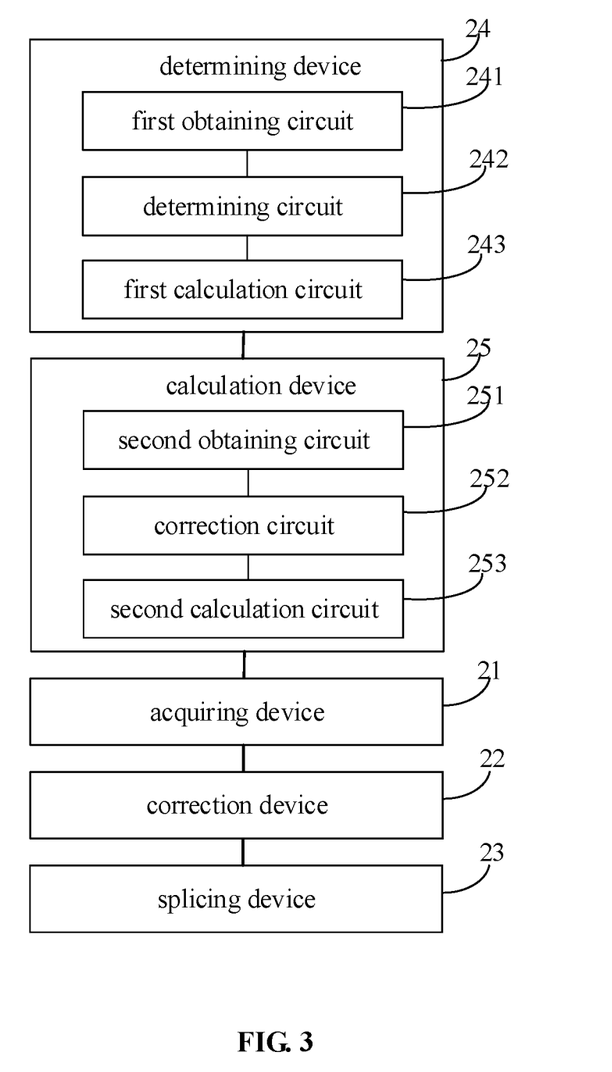
FIG. 3 is another schematic view of a mobile terminal image synthesis apparatus according to an embodiment of the present disclosure.

In one embodiment, referring to FIG. 3, the apparatus further includes a determining device 24 and a calculation device 25.

The determining device 24 is used to determine the first internal parameter of the front fisheye camera group and the second internal parameter of the rear fisheye camera group, respectively.

The calculation device 25 is used to calculate the splicing parameters between the front fisheye camera group and the rear fisheye camera group.

Further, referring to FIG. 3, the determining device 24 includes a first obtaining circuit 241, a determining circuit 242 and a first calculation circuit 243.

The first obtaining circuit 241 is used to, when rotating the mobile terminal around its vertical axis or horizontal axis, obtain each frame fisheye-image of the checkerboard collected by the front fisheye camera group and each frame fisheye-image of the checkerboard collected by the rear fisheye camera group, respectively, where all or parts of the checkerboard is in the view angle of the front fisheye camera group and/or the rear fisheye camera group all the time.

The determining circuit 242 is used to, determine, by a gyroscope of the mobile terminal, a first rotation angle of the mobile terminal when the front fisheye camera group collects each frame fisheye-image of the checkerboard and a second rotation angle of the mobile terminal when the rear fisheye camera group collects each frame fisheye-image of the checkerboard, respectively.

The first calculation circuit 243 is used to obtain the first internal parameter through calculation according to the projective reconstruction calibration algorithm based on each frame fisheye-image of the checkerboard collected by the front fisheye camera group and the corresponding first rotation angle, and obtain the second internal parameter through calculation according to the projective reconstruction calibration algorithm based on each frame fisheye-image of the checkerboard collected by the rear fisheye camera group and the corresponding second rotation angle.

Further, referring to FIG. 3, the calculation device 25 includes a second obtaining circuit 251, a correction circuit 252 and a second calculation circuit 253.

The second obtaining circuit 251 is used to, when a sum of a first angle that is defined between an optical axis of the front fisheye camera group and the checkerboard and a second angle that is defined between an optical axis of the rear fisheye camera group and the checkerboard is less than a predetermined angle threshold, obtain a first checkerboard fisheye image of the checkerboard collected by the front fisheye camera group and a second checkerboard fisheye image of the checkerboard collected by the rear fisheye camera group.

The correction circuit 252 is used to obtain a first checkerboard correction image by using the first internal parameter to correct the first checkerboard fisheye image and a second checkerboard correction image by using the second internal parameter to correct the second checkerboard fisheye image.

The second calculation circuit 253 is used to calculate splicing parameters between the first checkerboard correction image and the second checkerboard correction image according to matching information of checkerboard corners in the first checkerboard correction image and the second checkerboard correction image.

The splicing parameters between the first checkerboard correction image and the second checkerboard correction image are the splicing parameters between the front fisheye camera group and the rear fisheye camera group.

The splicing parameters may include a translation vector and a rotation angle.

In addition, one embodiment of the present disclosure further provides a mobile terminal which includes a memory, a processor and an image synthesis program stored in the memory and executable by the processor. When the image synthesis program is executed by the processor, the image synthesis program causes the processor to perform steps of the above mobile terminal image synthesis method, and the same technical effects can be achieved, which will not be elaborated herein to avoid duplicating.

Figure 4:
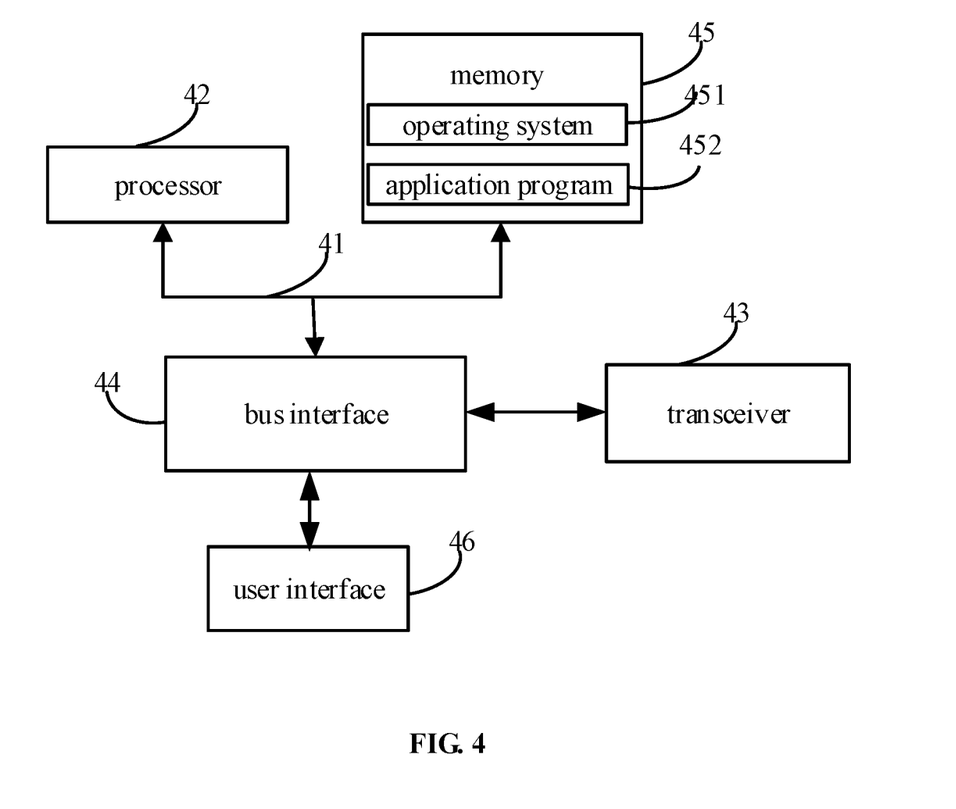
FIG. 4 is a schematic view of a mobile terminal according to an embodiment of the present disclosure.

Specifically, referring to FIG. 4, one embodiment of the present disclosure further provides a mobile terminal which includes a bus 41, a processor 42, a transceiver 43, a bus interface 44, a memory 45 and a user interface 46. Moreover, the mobile terminal further includes a front camera and a rear camera. Fisheye lenses may be applied to the front and rear cameras, thereby forming a front fisheye camera group and a rear fisheye camera group, respectively. A viewing angle of the front fisheye camera group is greater than 180 degrees, and a viewing angle of the rear fisheye camera group is greater than 180 degrees.

In one embodiment, the mobile terminal further includes an image synthesis program stored in the memory 45 and executable by the processor 42. When the image synthesis program is executed by the processor 42, the image synthesis program causes the processor 42 to perform steps of: acquiring a first fisheye image collected by the front fisheye camera group and a second fisheye image collected by the rear fisheye camera group; obtaining a first correction image by using a first internal parameter of the front fisheye camera group to correct the first fisheye image and obtaining a second correction image by using a second internal parameter of the rear fisheye camera group to correct the second fisheye image; and obtaining a synthetic image by splicing and combining the first correction image and the second correction image according to splicing parameters which are obtained in advance through calculation. The front fisheye camera group may be formed by applying a fisheye lens to the front camera of the mobile terminal, and the rear fisheye camera group may be formed by applying a fisheye lens to the rear camera of the mobile terminal. A viewing angle of each of the front fisheye camera group and the rear fisheye camera group is greater than 180 degrees.

The transceiver 43 is used to receive and transmit data under the control of the processor 42.

Optionally, when the image synthesis program is executed by the processor 42, the image synthesis program causes the processor 42 to perform steps of: determining the first internal parameter of the front fisheye camera group and the second internal parameter of the rear fisheye camera group; and calculating the splicing parameters between the front fisheye camera group and the rear fisheye camera group.

Optionally, when the image synthesis program is executed by the processor 42, the image synthesis program causes the processor 42 to perform steps of: when rotating the mobile terminal around its vertical axis or horizontal axis, obtaining each frame fisheye-image of the checkerboard collected by the front fisheye camera group and each frame fisheye-image of the checkerboard collected by the rear fisheye camera group, respectively, where all or parts of the checkerboard is in the view angle of the front fisheye camera group and/or the rear fisheye camera group all the time; determining, by a gyroscope of the mobile terminal, a first rotation angle of the mobile terminal when the front fisheye camera group collects each frame fisheye-image of the checkerboard and a second rotation angle of the mobile terminal when the rear fisheye camera group collects each frame fisheye-image of the checkerboard, respectively; and obtaining the first internal parameter through calculation according to the projective reconstruction calibration algorithm based on each frame fisheye-image of the checkerboard collected by the front fisheye camera group and the corresponding first rotation angle, and obtaining the second internal parameter through calculation according to the projective reconstruction calibration algorithm based on each frame fisheye-image of the checkerboard collected by the rear fisheye camera group and the corresponding second rotation angle.

Optionally, when the image synthesis program is executed by the processor 42, the image synthesis program causes the processor 42 to perform steps of: when a sum of a first angle that is defined between an optical axis of the front fisheye camera group and the checkerboard and a second angle that is defined between an optical axis of the rear fisheye camera group and the checkerboard is less than a predetermined angle threshold, obtaining a first checkerboard fisheye image of the checkerboard collected by the front fisheye camera group and a second checkerboard fisheye image of the checkerboard collected by the rear fisheye camera group; obtaining a first checkerboard correction image by using the first internal parameter to correct the first checkerboard fisheye image, and a second checkerboard correction image by using the second internal parameter to correct the second checkerboard fisheye image; and calculating splicing parameters between the first checkerboard correction image and the second checkerboard correction image according to matching information of checkerboard corners in the first checkerboard correction image and the second checkerboard correction image. The splicing parameters between the first checkerboard correction image and the second checkerboard correction image are the splicing parameters between the front fisheye camera group and the rear fisheye camera group.

The splicing parameters may include a translation vector and a rotation angle.

In FIG. 4, the bus architecture (represented by the bus 41) may include a number of buses and bridges connected to each other, so as to connect various circuits for one or more processors 42 and one or more memories 45. In addition, as is known in the art, the bus architecture may be used to connect any other circuits, such as a circuit for a peripheral device, a circuit for a voltage stabilizer and a power management circuit. Bus interfaces 44 are also provided, and the transceiver 43 may consist of more than one element, e.g., a transmitter and a receiver for communication with any other devices over a transmission medium. The user interface 46 may also be provided for other devices which may include but not limited to a keypad, a display, a speaker, a microphone and a joystick.

The processor 42 takes charge of managing the bus architecture as well as general processing. The memory 45 may store therein data desired for the operation of the processor 42.

Optionally, the processor 42 may be CPU, ASIC, FPGA or CPLD.

It may be understood that, the memory 45 in one embodiment of the present disclosure may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. Through exemplary rather than limited description, RAMs in many forms may be used, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). The memory 45 in this embodiment of the present disclosure may include, but not limited to, the foregoing memories and any other memory of a suitable type.

In some embodiments, the memory 45 stores elements, such as an executable module or a data structure, a subset of an executable module or a data structure, or an extended set of an executable module or a data structure, such as an operating system 451 and an application program 452.

The operating system 451 includes various system programs, such as a framework layer, a core library layer and a driver layer, which are used to implement various basic services and process hardware-based tasks. The application program 452 includes various operation instructions, such as a media player and a browser, which are used to implement various operations. The program for implementing the method of the embodiment of the present disclosure may be included in the application program 452.

One embodiment of the present disclosure further provides a computer-readable memory, which stores an image synthesis program. When the image synthesis program is executed by a processor, the image synthesis program causes the processor to perform steps of the above mobile terminal image synthesis method, and the same technical effects can be achieved, which will not be elaborated herein to avoid duplicating.

Specifically, when the image synthesis program is executed by the processor, the image synthesis program causes the processor to perform steps of: acquiring a first fisheye image collected by the front fisheye camera group and a second fisheye image collected by the rear fisheye camera group; obtaining a first correction image by using a first internal parameter of the front fisheye camera group to correct the first fisheye image and obtaining a second correction image by using a second internal parameter of the rear fisheye camera group to correct the second fisheye image; and obtaining a synthetic image by splicing and combining the first correction image and the second correction image according to splicing parameters which are obtained in advance through calculation. The front fisheye camera group may be formed by applying a fisheye lens to the front camera of the mobile terminal, and the rear fisheye camera group may be formed by applying a fisheye lens to the rear camera of the mobile terminal. A viewing angle of each of the front fisheye camera group and the rear fisheye camera group is greater than 180 degrees.

Optionally, when the image synthesis program is executed by the processor, the image synthesis program causes the processor to perform steps of: determining the first internal parameter of the front fisheye camera group and the second internal parameter of the rear fisheye camera group; and calculating the splicing parameters between the front fisheye camera group and the rear fisheye camera group.

Optionally, when the image synthesis program is executed by the processor, the image synthesis program causes the processor to perform steps of: when rotating the mobile terminal around its vertical axis or horizontal axis, obtaining each frame fisheye-image of the checkerboard collected by the front fisheye camera group and each frame fisheye-image of the checkerboard collected by the rear fisheye camera group, respectively, where all or parts of the checkerboard is in the view angle of the front fisheye camera group and/or the rear fisheye camera group all the time; determining, by a gyroscope of the mobile terminal, a first rotation angle of the mobile terminal when the front fisheye camera group collects each frame fisheye-image of the checkerboard and a second rotation angle of the mobile terminal when the rear fisheye camera group collects each frame fisheye-image of the checkerboard, respectively; and obtaining the first internal parameter through calculation according to the projective reconstruction calibration algorithm based on each frame fisheye-image of the checkerboard collected by the front fisheye camera group and the corresponding first rotation angle, and obtaining the second internal parameter through calculation according to the projective reconstruction calibration algorithm based on each frame fisheye-image of the checkerboard collected by the rear fisheye camera group and the corresponding second rotation angle.

Optionally, when the image synthesis program is executed by the processor, the image synthesis program causes the processor to perform steps of: when a sum of a first angle that is defined between an optical axis of the front fisheye camera group and the checkerboard and a second angle that is defined between an optical axis of the rear fisheye camera group and the checkerboard is less than a predetermined angle threshold, obtaining a first checkerboard fisheye image of the checkerboard collected by the front fisheye camera group and a second checkerboard fisheye image of the checkerboard collected by the rear fisheye camera group; obtaining a first checkerboard correction image by using the first internal parameter to correct the first checkerboard fisheye image, and a second checkerboard correction image by using the second internal parameter to correct the second checkerboard fisheye image; and calculating splicing parameters between the first checkerboard correction image and the second checkerboard correction image according to matching information of checkerboard corners in the first checkerboard correction image and the second checkerboard correction image. The splicing parameters between the first checkerboard correction image and the second checkerboard correction image are the splicing parameters between the front fisheye camera group and the rear fisheye camera group.

The splicing parameters may include a translation vector and a rotation angle.

The computer readable media includes perpetual, non-perpetual, removable, and non-removable media, implemented in any method or technology for storage of information. The information may be computer readable instructions, data structures, program modules, or other data. Examples of computer storage media include, but are not limited to, a phase change memory (PRAM), a static random access memory (SRAM), a dynamic random access memory (DRAM), a random access memory (RAM) of other types, a read-only memory (ROM), an electrically erasable programmable read-only memory (EEPROM), a flash memory or any other memory technology, a compact disc read-only memory (CD-ROM), a digital versatile disk (DVD) or other optical storage, a magnetic cassette, a magnetic tape, magnetic disk storage or other magnetic storage devices, or any other non-transmission medium that can be used to store information for access by a computing device. As defined herein, the computer readable media does not include non-persistent computer readable media (transitory media), for example, a modulated data signal and a carrier wave.

It should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the presence of additional identical elements in the process, method, article, or device that includes the element.

Ordinal number words such as "first" and "second" mentioned in the embodiments of the present invention should be construed as being used only for differentiation, unless the ordinal numbers really express the meaning of order according to the context.

Through the description of the preferred embodiments, it can be clearly understood by those of skill in the art that the present disclosure can be realized by virtue of software plus necessary hardware platforms, and certainly it can also be realized totally by virtue of hardware. Based on this understanding, the technical solution of the present disclosure contributing to the prior art may be entirely or partly embodied in the software product form. The computer software product is stored in a storage medium, such as a ROM/RAM, a floppy disk, or an optical disk, and includes several instructions adapted to enable a computer device (such as a mobile phone, a personal computer, a server, an air conditioner or a network device) to execute the method according to each embodiment or certain parts of the embodiments of the present disclosure.

The above are merely the preferred embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure.

What is claimed is:

1. A mobile terminal image synthesis method comprising:
    determining a first internal parameter of a front fisheye camera group and a second internal parameter of a rear fisheye camera group;
    calculating splicing parameters between the front fisheye camera group and the rear fisheye camera group;
    acquiring a first fisheye image collected by the front fisheye camera group and a second fisheye image collected by the rear fisheye camera group, wherein the front fisheye camera group includes a front camera of a mobile terminal and a fisheye lens applied to the front camera, and the rear fisheye camera group includes a rear camera of the mobile terminal and a fisheye lens applied to the rear camera, and a viewing angle of each of the front fisheye camera group and the rear fisheye camera group is greater than 180 degrees;
    obtaining a first correction image by using the first internal parameter of the front fisheye camera group to correct the first fisheye image, and obtaining a second correction image by using the second internal parameter of the rear fisheye camera group to correct the second fisheye image; and
    obtaining a synthetic image by splicing and combining the first correction image and the second correction image according to splicing parameters,
    wherein the determining a first internal parameter of a front fisheye camera group and a second internal parameter of a rear fisheye camera group, includes:
        when rotating the mobile terminal around a vertical axis or a horizontal axis of the mobile terminal, obtaining each frame fisheye-image of the checkerboard collected by the front fisheye camera group and each frame fisheye-image of the checkerboard collected by the rear fisheye camera group, respectively, wherein all or parts of the checkerboard is in the view angle of at least one of the front fisheye camera group and the rear fisheye camera group all the time;
        determining, by a gyroscope of the mobile terminal, a first rotation angle of the mobile terminal when the front fisheye camera group collects each frame fisheye-image of the checkerboard and a second rotation angle of the mobile terminal when the rear fisheye camera group collects each frame fisheye-image of the checkerboard, respectively; and
        obtaining the first internal parameter through calculation according to a projective reconstruction calibration algorithm based on each frame fisheye-image of the checkerboard collected by the front fisheye camera group and the first rotation angle, and obtaining the second internal parameter through calculation according to the projective reconstruction calibration algorithm based on each frame fisheye-image of the checkerboard collected by the rear fisheye camera group and the second rotation angle.

2. The method of claim 1, wherein the calculating the splicing parameters between the front fisheye camera group and the rear fisheye camera group, includes:
    when a sum of a first angle that is defined between an optical axis of the front fisheye camera group and the checkerboard and a second angle that is defined between an optical axis of the rear fisheye camera group and the checkerboard is less than a first angle threshold, obtaining a first checkerboard fisheye image of the checkerboard collected by the front fisheye camera group and a second checkerboard fisheye image of the checkerboard collected by the rear fisheye camera group;
    obtaining a first checkerboard correction image by using the first internal parameter to correct the first checkerboard fisheye image, and a second checkerboard correction image by using the second internal parameter to correct the second checkerboard fisheye image; and
    calculating splicing parameters between the first checkerboard correction image and the second checkerboard correction image according to matching information of checkerboard corners in the first checkerboard correction image and the second checkerboard correction image;
    wherein the splicing parameters between the first checkerboard correction image and the second checkerboard correction image are the splicing parameters between the front fisheye camera group and the rear fisheye camera group.

3. The method of claim 2, wherein the splicing parameters include a translation vector and a rotation angle.

4. A mobile terminal image synthesis apparatus comprising:
- a determining device configured to determine a first internal parameter of a front fisheye camera group and a second internal parameter of a rear fisheye camera group, respectively;
- a calculation device configured to calculate splicing parameters between the front fisheye camera group and the rear fisheye camera group;
- an acquiring device configured to acquire a first fisheye image collected by the front fisheye camera group and a second fisheye image collected by the rear fisheye camera group, wherein the front fisheye camera group includes a front camera of a mobile terminal and a fisheye lens applied to the front camera, and the rear fisheye camera group includes a rear camera of the mobile terminal and a fisheye lens applied to the rear camera, and a viewing angle of each of the front fisheye camera group and the rear fisheye camera group is greater than 180 degrees;
- a correction device configured to obtain a first correction image by using the first internal parameter of the front fisheye camera group to correct the first fisheye image and obtain the second correction image by using a second internal parameter of the rear fisheye camera group to correct the second fisheye image; and
- a splicing device configured to obtain a synthetic image by splicing and combining the first correction image and the second correction image according to splicing parameters, wherein the determining device includes:
- a first obtaining circuit configured to, when rotating the mobile terminal around a vertical axis or a horizontal axis of the mobile terminal, obtain each frame fisheye-image of the checkerboard collected by the front fisheye camera group and each frame fisheye-image of the checkerboard collected by the rear fisheye camera group, respectively, where all or parts of the checkerboard is in the view angle of at least one of the front fisheye camera group and the rear fisheye camera group all the time;
- a determining circuit configured to, determine, by a gyroscope of the mobile terminal, a first rotation angle of the mobile terminal when the front fisheye camera group collects each frame fisheye-image of the checkerboard and a second rotation angle of the mobile terminal when the rear fisheye camera group collects each frame fisheye-image of the checkerboard, respectively; and
- a first calculation circuit configured to obtain the first internal parameter through calculation according to a projective reconstruction calibration algorithm based on each frame fisheye-image of the checkerboard collected by the front fisheye camera group and the first rotation angle, and obtain the second internal parameter through calculation according to the projective reconstruction calibration algorithm based on each frame fisheye-image of the checkerboard collected by the rear fisheye camera group and the second rotation angle.

5. The apparatus of claim 4, wherein the calculation device includes:
- a second obtaining circuit configured to, when a sum of a first angle that is defined between an optical axis of the front fisheye camera group and the checkerboard and a second angle that is defined between an optical axis of the rear fisheye camera group and the checkerboard is less than a first angle threshold, obtain a first checkerboard fisheye image of the checkerboard collected by the front fisheye camera group and a second checkerboard fisheye image of the checkerboard collected by the rear fisheye camera group;
- a correction circuit configured to obtain a first checkerboard correction image by using the first internal parameter to correct the first checkerboard fisheye image and a second checkerboard correction image by using the second internal parameter to correct the second checkerboard fisheye image; and
- a second calculation circuit configured to calculate splicing parameters between the first checkerboard correction image and the second checkerboard correction image according to matching information of checkerboard corners in the first checkerboard correction image and the second checkerboard correction image;

wherein the splicing parameters between the first checkerboard correction image and the second checkerboard correction image are the splicing parameters between the front fisheye camera group and the rear fisheye camera group.

6. The apparatus of claim 5, wherein the splicing parameters include a translation vector and a rotation angle.

7. A mobile terminal comprising:
- a memory;
- a processor; and
- an image synthesis program stored in the memory and executable by the processor, wherein when the image synthesis program is executed by the processor, the image synthesis program causes the processor to perform the mobile terminal image synthesis method of claim 1.

8. The mobile terminal of claim 7, wherein when the image synthesis program is executed by the processor, the image synthesis program causes the processor to,
- when a sum of a first angle that is defined between an optical axis of the front fisheye camera group and the checkerboard and a second angle that is defined between an optical axis of the rear fisheye camera group and the checkerboard is less than a first angle threshold, obtain a first checkerboard fisheye image of the checkerboard collected by the front fisheye camera group and a second checkerboard fisheye image of the checkerboard collected by the rear fisheye camera group;
- obtain a first checkerboard correction image by using the first internal parameter to correct the first checkerboard fisheye image, and a second checkerboard correction image by using the second internal parameter to correct the second checkerboard fisheye image; and
- calculate splicing parameters between the first checkerboard correction image and the second checkerboard correction image according to matching information of checkerboard corners in the first checkerboard correction image and the second checkerboard correction image;

wherein the splicing parameters between the first checkerboard correction image and the second checkerboard correction image are the splicing parameters between the front fisheye camera group and the rear fisheye camera group.

9. The mobile terminal of claim 8, wherein the splicing parameters include a translation vector and a rotation angle.

10. A computer-readable memory storing an image synthesis program, wherein when the image synthesis program is executed by a processor, the image synthesis program causes the processor to perform the mobile terminal image synthesis method of claim 1.

* * * * *